US012613558B2

(12) United States Patent
Liu et al.

(10) Patent No.: US 12,613,558 B2
(45) Date of Patent: Apr. 28, 2026

(54) SUPPORT PLATE AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Chang Liu, Beijing (CN); Ying Zhang, Beijing (CN); Jizhe Wang, Beijing (CN); Zijie Zhang, Beijing (CN); Binfeng Feng, Beijing (CN); Fei Li, Beijing (CN); Kai Miao, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 142 days.

(21) Appl. No.: 18/577,209

(22) PCT Filed: Jan. 3, 2023

(86) PCT No.: PCT/CN2023/070189
§ 371 (c)(1),
(2) Date: Jan. 5, 2024

(87) PCT Pub. No.: WO2023/138359
PCT Pub. Date: Jul. 27, 2023

(65) Prior Publication Data
US 2024/0319771 A1 Sep. 26, 2024

(30) Foreign Application Priority Data
Jan. 21, 2022 (CN) .......................... 202210073890.3

(51) Int. Cl.
*G06F 1/16* (2006.01)

(52) U.S. Cl.
CPC .......... *G06F 1/1656* (2013.01); *G06F 1/1616* (2013.01); *G06F 1/1652* (2013.01)

(58) Field of Classification Search
CPC .... G06F 1/1656; G06F 1/1616; G06F 1/1652; G06F 1/1618; G06F 1/1681
See application file for complete search history.

(56) References Cited

U.S. PATENT DOCUMENTS

| | | | |
|---|---|---|---|
| 10,056,443 B2 | 8/2018 | Shyu et al. | |
| 2021/0029841 A1 | 1/2021 | Kim et al. | |
| | (Continued) | | |

FOREIGN PATENT DOCUMENTS

| | | |
|---|---|---|
| CN | 205665971 U | 10/2016 |
| CN | 107886846 A | 4/2018 |
| | (Continued) | |

*Primary Examiner* — Sagar Shrestha
(74) *Attorney, Agent, or Firm* — ArentFox Schiff LLP; Michael Fainberg

(57) ABSTRACT

A support plate (001) and a display device including the support plate (001) are provided. The support plate (001) is used for supporting a flexible display module (002). The support plate (001) includes a bending area (BA). The bending area (BA) includes a plurality of hollowed-out patterns (101) arranged in an array. A connecting portion (102) is arranged between two adjacent hollowed-out patterns (101) in the same row. The connecting portions (102) in at least three adjacent rows are staggered in a column direction, which is beneficial for uniform distribution of bending stress.

17 Claims, 14 Drawing Sheets

(56)                    References Cited

U.S. PATENT DOCUMENTS

| | | | |
|---|---|---|---|
| 2021/0153363 | A1 | 5/2021 | Cao et al. |
| 2021/0165454 | A1* | 6/2021 | Dong .................... G06F 1/1652 |
| 2021/0233447 | A1 | 7/2021 | Park |
| 2022/0036774 | A1 | 2/2022 | Wang et al. |
| 2022/0223074 | A1* | 7/2022 | Park ........................ G09F 9/301 |
| 2022/0269310 | A1 | 8/2022 | Xiong et al. |
| 2022/0343809 | A1 | 10/2022 | Chen et al. |
| 2023/0018777 | A1* | 1/2023 | Park ...................... G06F 1/1656 |
| 2023/0164931 | A1* | 5/2023 | Wang ................... G06F 1/1624 |
| | | | 361/807 |
| 2024/0081003 | A1* | 3/2024 | Wang ................... H05K 5/0217 |

FOREIGN PATENT DOCUMENTS

| | | | |
|---|---|---|---|
| CN | 208141720 | U | 11/2018 |
| CN | 109360499 | A | 2/2019 |
| CN | 110062077 | A | 7/2019 |
| CN | 110767096 | A | 2/2020 |
| CN | 110992828 | A | 4/2020 |
| CN | 111261797 | A | 6/2020 |
| CN | 211928943 | U | 11/2020 |
| CN | 112150926 | A | 12/2020 |
| CN | 112382198 | A | 2/2021 |
| CN | 112991948 | A | 6/2021 |
| CN | 112991953 | A | 6/2021 |
| CN | 113257119 | A | 8/2021 |
| CN | 113257124 | A | 8/2021 |
| CN | 113380145 | A | 9/2021 |
| CN | 113593417 | A | 11/2021 |
| CN | 217562184 | U | 10/2022 |
| KR | 10-2019-0003257 | A | 1/2019 |

* cited by examiner

002

SUPPORT PLATE AND DISPLAY DEVICE

CROSS-REFERENCE TO RELATED APPLICATIONS

The present application is a National Stage of International Application No. PCT/CN2023/070189, filed Jan. 3, 2023 which claims priority to Chinese Patent Application No. 202210073890.3, filed with the China National Intellectual Property Administration on Jan. 21, 2022 and entitled "Support Plate and Display Device", the entire content of which is hereby incorporated by reference.

TECHNICAL FIELD

The disclosure relates to the field of display technology, and in particular to a support plate and a display device.

BACKGROUND

With the upgrading of electronic products, the display screens of various display devices (such as mobile phones, tablet computers, etc.) are becoming larger and larger. This is because larger display screens can provide users with rich information to improve the efficiency of man-machine communication, and can bring a better use experience. However, as the display screen increases, the body size of the display device will also increase accordingly, causing the problem of inconvenience in carrying and storage, and thus restricting the expansion of the display screen. Foldable display devices that rely on flexible display screens have emerged. The foldable display device has a smaller area and is easier for a user to carry in the folded state; and the display area has a larger area and provides a better visual experience effect in the unfolded state. Therefore, the foldable display device takes into account the miniaturization of the body and the large display screen, and has become a development trend.

SUMMARY

The solutions of a support plate and a display device provided in the embodiments of the disclosure are as follows.

In one aspect, embodiments of the disclosure provide a support plate for supporting a flexible display module, where the support plate includes a bending area, the bending area includes a plurality of hollowed-out patterns arranged in an array, there is a connecting portion between two adjacent hollowed-out patterns in a same row, and connecting portions in at least three adjacent rows are staggered in a column direction.

In some embodiments, in the above-mentioned support plate provided by the embodiments of the disclosure, the bending area further includes grooves located in at least some row gaps of the hollowed-out patterns.

In some embodiments, in the above-mentioned support plate provided by the embodiments of the disclosure, every three adjacent rows of hollowed-out patterns form a group, and the grooves are located at group gaps of the hollowed-out patterns.

In some embodiments, in the above-mentioned support plate provided by the embodiments of the disclosure, all the connecting portions are staggered in the column direction.

In some embodiments, in the above-mentioned support plate provided by the embodiments of the disclosure, every n (n≥3 and n is an integer) adjacent rows of hollowed-out patterns is a cycle, and connecting portions in a same cycle are staggered in the column direction.

In some embodiments, in the above-mentioned support plate provided by the embodiments of the disclosure, the connecting portions have a same length in a row direction, and the hollowed-out patterns between any two adjacent connecting portions in a same row have a same length in the row direction.

In some embodiments, in the above-mentioned support plate provided by the embodiments of the disclosure, the connecting portions adjacent in the column direction have different lengths in a row direction, and the hollowed-out patterns between any two adjacent connecting portions in a same row have different lengths in the row direction.

In some embodiments, in the above-mentioned support plate provided by the embodiments of the disclosure, the hollowed-out pattern includes an end portion, the end portion is arranged in contact with the connecting portion, and a contact surface between the end portion and the connecting portion is a curved surface.

In some embodiments, in the above-mentioned support plate provided by the embodiments of the disclosure, end portions on both sides of a same connecting portion have a same shape.

In some embodiments, in the above-mentioned support plate provided by the embodiments of the disclosure, all end portions have a same shape.

In some embodiments, in the above-mentioned support plate provided by the embodiments of the disclosure, end portions in odd-numbered rows have a same shape, end portions in even-numbered rows have a same shape, and the shape of the end portions in the odd-numbered rows is different from the shape of the end portions in the even-numbered rows.

In some embodiments, in the above-mentioned support plate provided by the embodiments of the disclosure, end portions on both sides of a same connecting portion have different shapes.

In some embodiments, in the above-mentioned support plate provided by the embodiments of the disclosure, the hollowed-out pattern further includes an extension portion, the extension portion is arranged integrally with the end portion, the extension portion is located at one side of the end portion away from the connecting portion, and a width of the extension portion in the column direction is less than or equal to a maximum width of the end portion in the column direction.

In some embodiments, in the above-mentioned support plate provided by the embodiments of the disclosure, the end portion is drop-shaped, U-shaped or capsule-shaped.

In some embodiments, in the above-mentioned support plate provided by the embodiments of the disclosure, an edge of the bending area extending in the column direction is discontinuously arranged.

In some embodiments, in the above-mentioned support plate provided by the embodiments of the disclosure, an extending direction of the hollowed-out pattern is parallel to a bending axis of the bending area.

In some embodiments, in the above-mentioned support plate provided by the embodiments of the disclosure, the support plate further includes unbending areas located on both sides of the bending area parallel to a bending axis.

In another aspect, embodiments of the disclosure further provide a display device, including: a flexible display module and a support plate, where the support plate is the above-mentioned support plate provided by the embodiments of the disclosure, and the support plate is attached to an opposite side of a display side of the flexible display module.

DETAILED DESCRIPTION

Figure 1:
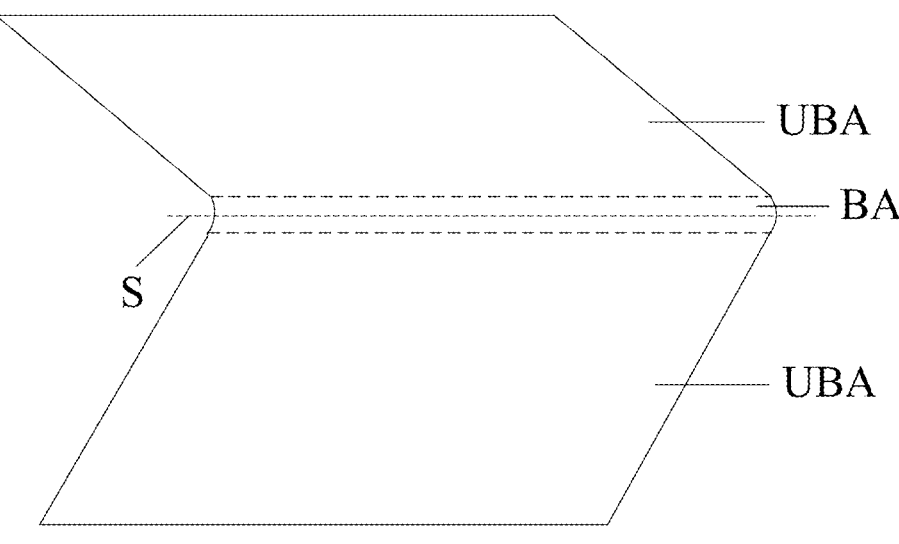
FIG. 1 is a schematic diagram of a support plate in the folded state according to an embodiment of the disclosure.

In order to make the purposes, technical solutions and advantages of the disclosure clearer, the technical solutions of the embodiments of the disclosure will be described clearly and completely below in combination with the accompanying drawings of the embodiments of the disclosure. It is necessary to note that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

Unless otherwise defined, the technical or scientific terms used here shall have the general meaning understood by those ordinary skilled in the art to which the disclosure belongs. The "first", "second" and similar words used in the specification and claims of the disclosure do not represent any order, number or importance, and are only used to distinguish different components. The word such as "include" or "comprise" or the like means that the element or object appearing before this word encompasses the elements or objects and their equivalents listed after this word, without excluding other elements or objects. The words such as "inner", "outer", "up", "down" are only used to represent the relative position relationship. When the absolute position of a described object changes, the relative position relationship may also change accordingly.

In a foldable display device in the related art, a support plate is usually arranged on the opposite side of the display side of the flexible display module, and a plurality of hollowed-out patterns are arranged in the bending area of the support plate to meet the bending performance of the foldable display device. However, in the related art, the hollowed-out patterns in the odd-numbered rows are arranged in the same way, the hollowed-out patterns in the even-numbered rows are arranged in the same way, and the hollowed-out patterns in the odd-numbered rows are arranged in a different manner from the hollowed-out patterns in the even-numbered rows, so that the $m^{th}$ (m is a positive integer) connecting portions (located between two hollowed-out patterns in the same row) in the odd-numbered rows are located on a same straight line, and the $m^{th}$ (m is a positive integer) connecting portions in the even-numbered rows are also located on a same straight line. During the bending process, the bending stress will accumulate on the above-mentioned straight lines and cannot be released, resulting in film printing. In the related art, the film printing is concealed by increasing the thickness of the glue on the surfaces of the hollowed-out patterns in the bending area or by covering the surface of the support plate having the hollowed-out patterns with a support plate having no hollowed-out pattern, but both of these schemes increase the weight of the foldable display device and cannot meet the development trend of pursuing lightness and thinness.

In order to solve the above technical problem existing in the related art, embodiments of the disclosure provide a support plate (such as stainless steel plate, SUS) for supporting a flexible display module. As shown in FIGS. 1 to 5, the support plate includes a bending area BA. The bending area BA includes a plurality of hollowed-out patterns 101 arranged in an array. There is a connecting portion 102 between two adjacent hollowed-out patterns 101 in a same row, and connecting portions 102 in at least three adjacent rows are staggered in a column direction Y.

In the above-mentioned support plate provided by the embodiments of the disclosure, the connecting portions 102 in at least three adjacent rows are staggered in the column direction Y by improving the arrangement of the hollowed-out patterns 101, so as to reduce the probability that the connecting portions 102 are located on the same straight line, thus facilitating the uniform distribution of the bending stress and effectively solving the problem of film printing. Moreover, the disclosure does not need to increase the thickness of the glue or provide an additional support plate as in the related art, so the disclosure will not increase the weight of the product and is conducive to achieving a lightweight and thin design.

Figure 3:
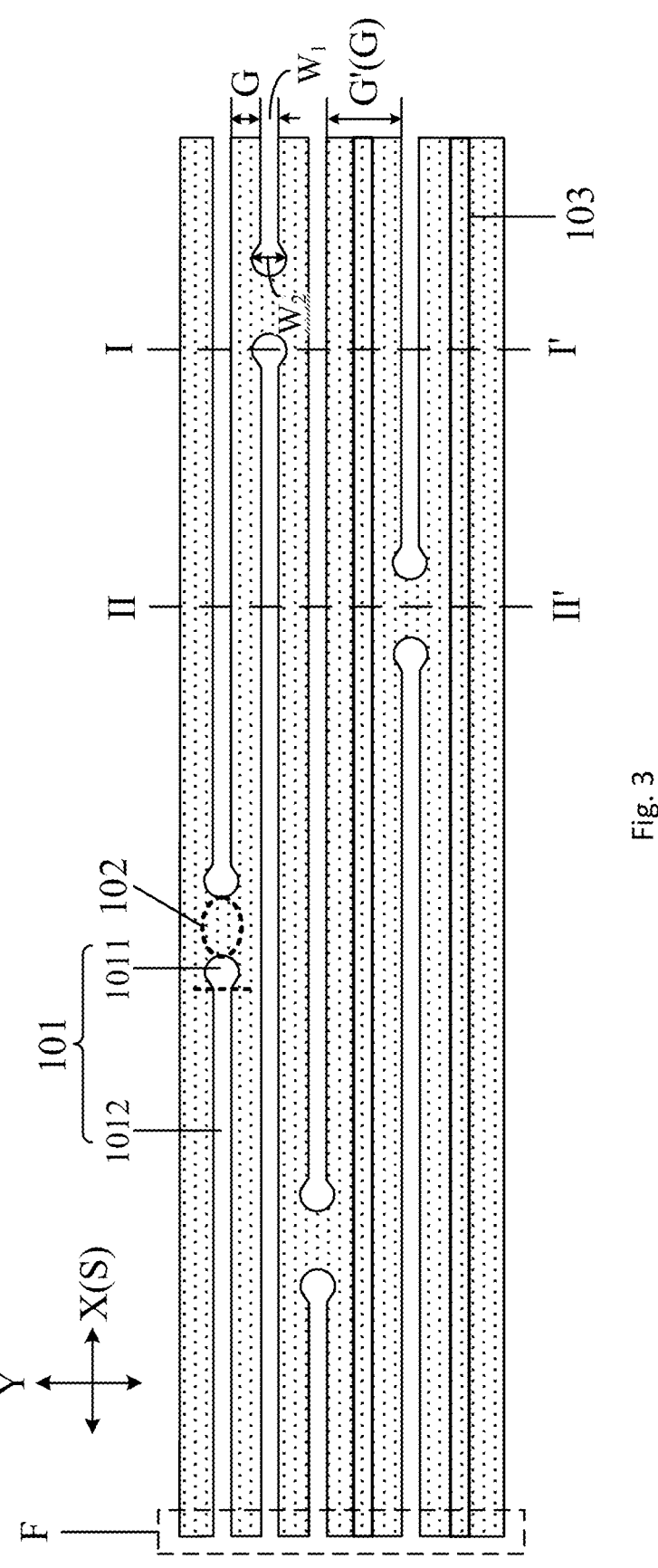
FIG. 3 is a structural schematic diagram of the bending area in the support plate according to an embodiment of the disclosure.
Figure 4:
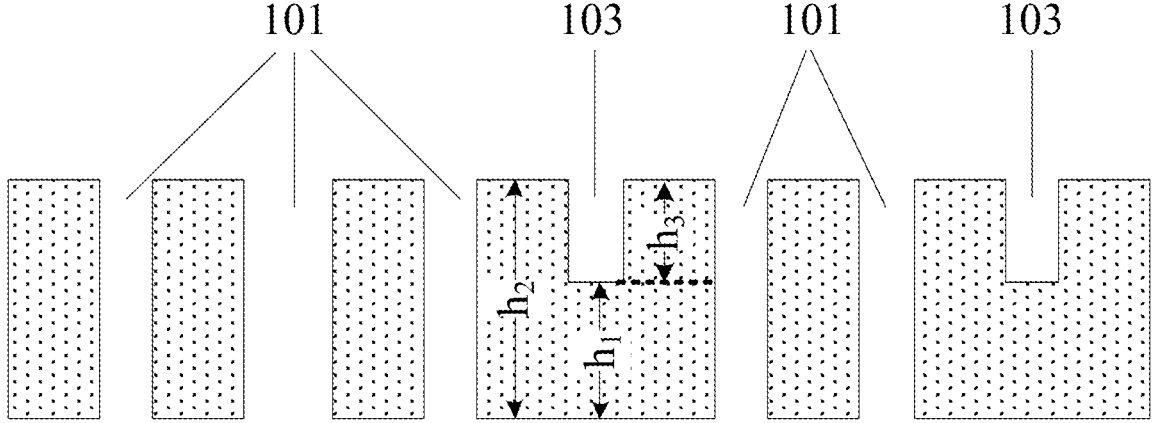
FIG. 4 is a cross-sectional view along I-I' in FIG. 3.
Figure 5:
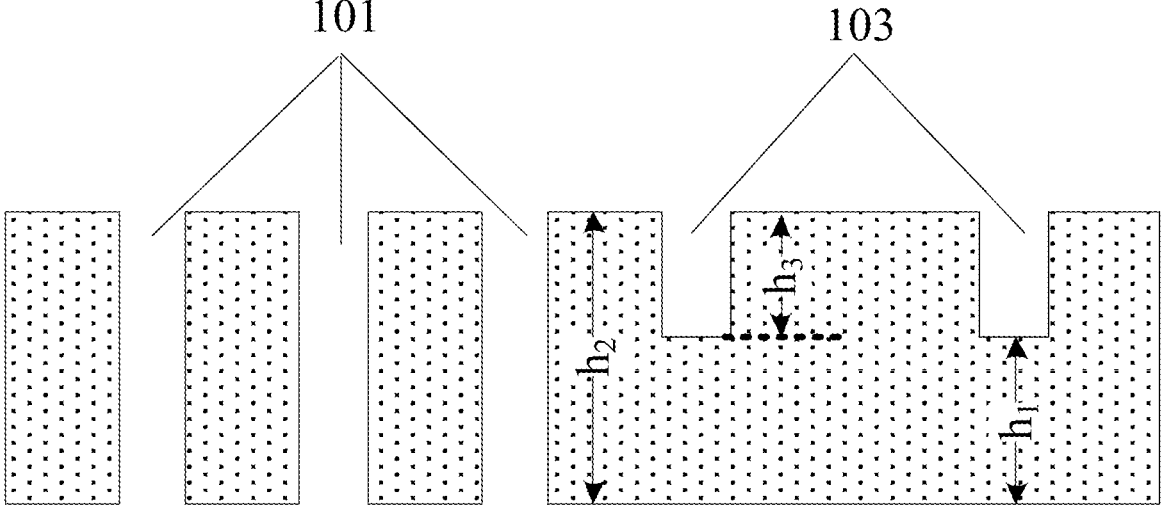
FIG. 5 is a cross-sectional view along II-II' in FIG. 3.

In some embodiments, in the above-mentioned support plate provided by the embodiments of the disclosure, as shown in FIGS. 3 to 5, the bending area BA may further include: grooves 103 located in at least some row gaps G of the hollowed-out patterns 101. The existence of the grooves 103 provides a dispersion channel for the bending stress at the connecting portions 102, thereby preventing the bending stress from being too concentrated at the connecting portions 102. Therefore, the problem of film printing can be effectively solved. Furthermore, it should be understood that, as shown in FIGS. 4 and 5, the thickness $h_1$ of the support plate at the groove 103 is less than the thickness $h_2$ of the support plate outside the grooves 103 and the hollowed-out patterns 101, so the arrangement of the grooves 103 can reduce the overall weight of the support plate, meeting the development trend of thinness and lightness. Optionally, the depth $h_3$ of the groove 103 may be less than or equal to half of the thickness $h_2$ of the support plate outside the grooves 103 and the hollowed-out patterns 101, that is, the thickness $h_1$ of the support plate at the groove 103 is greater than or equal to half of the thickness $h_2$ of the support plate outside the grooves 103 and the hollowed-out patterns 101, thus effectively disperse the bending stress while ensuring the modulus of the support plate. Optionally, as shown in FIGS. 3, 6, 7 and 10, the groove 103 may extend across the bending area BA in the row direction X; or, as shown in FIGS. 8 and 9, the groove 103 may not extend across the bending area BA in the row direction X, which is not specifically limited here.

In some embodiments, in the above-mentioned support plate provided by the embodiments of the disclosure, as shown in FIGS. 6 to 10, every three adjacent rows of hollowed-out patterns 101 form a group, and the grooves 103 are located at group gaps G' of the hollowed-out patterns 101. In the disclosure, since the connecting portions 102 in at least three rows are staggered in the column direction Y, no film printing will be produced due to the bending stress in the area of the at least three rows. Therefore, the grooves 103 may be arranged at the group gaps G' of every three adjacent rows of hollowed-out patterns 101, to further disperse the bending stress and reduce the risk of producing the film printing. Furthermore, even if the connecting portions 102 in the remaining rows other than the three rows are located on the same straight line, the bending stress at the connecting portions 102 in every three adjacent rows can be effectively diffused to adjacent grooves 103 on both sides, so that the bending stress is distributed more evenly, thus further reducing the probability that the film printing appears. Of course, during implementations, one group is not limited to every three adjacent rows of hollowed-out patterns 101, and the number of rows of hollowed-out patterns 101 in each group can also be flexibly set according to actual needs.

Figure 6:
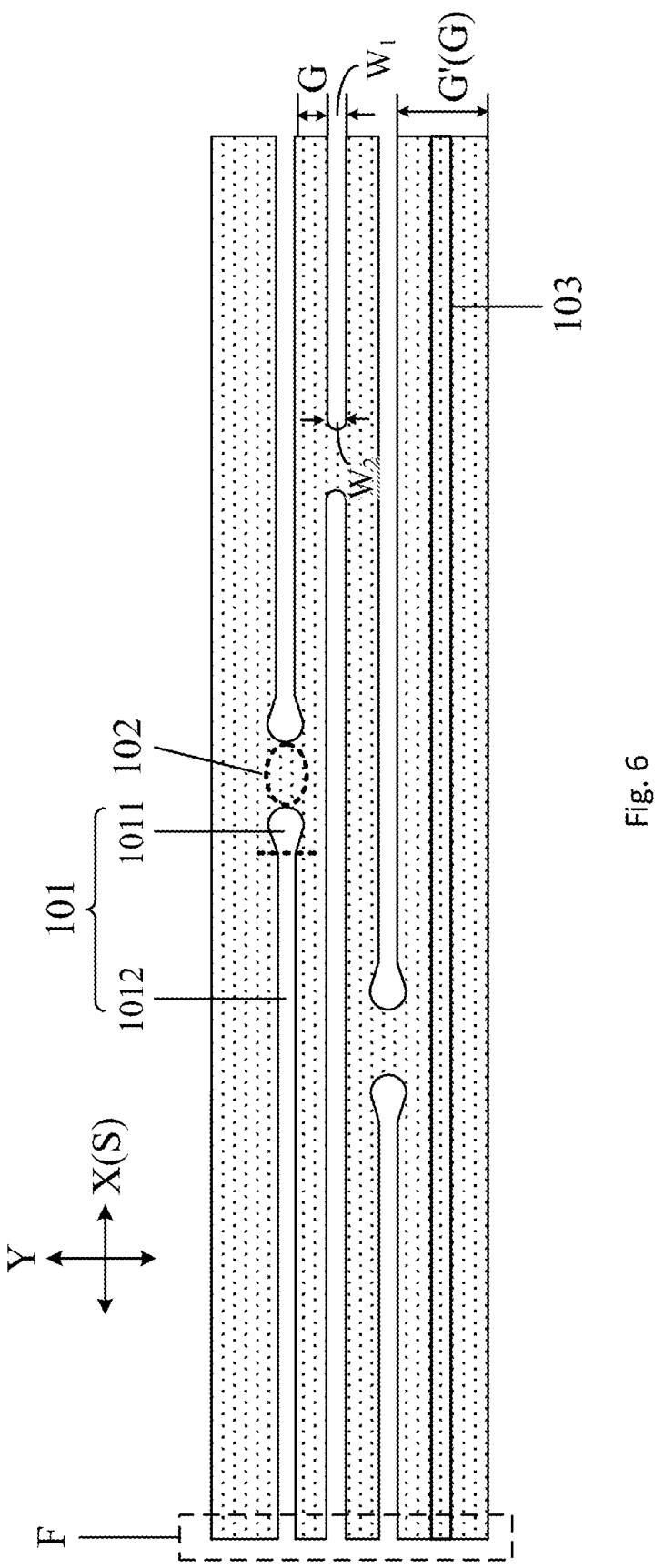
FIG. 6 is another structural schematic diagram of the bending area in the support plate according to an embodiment of the disclosure.
Figure 7:
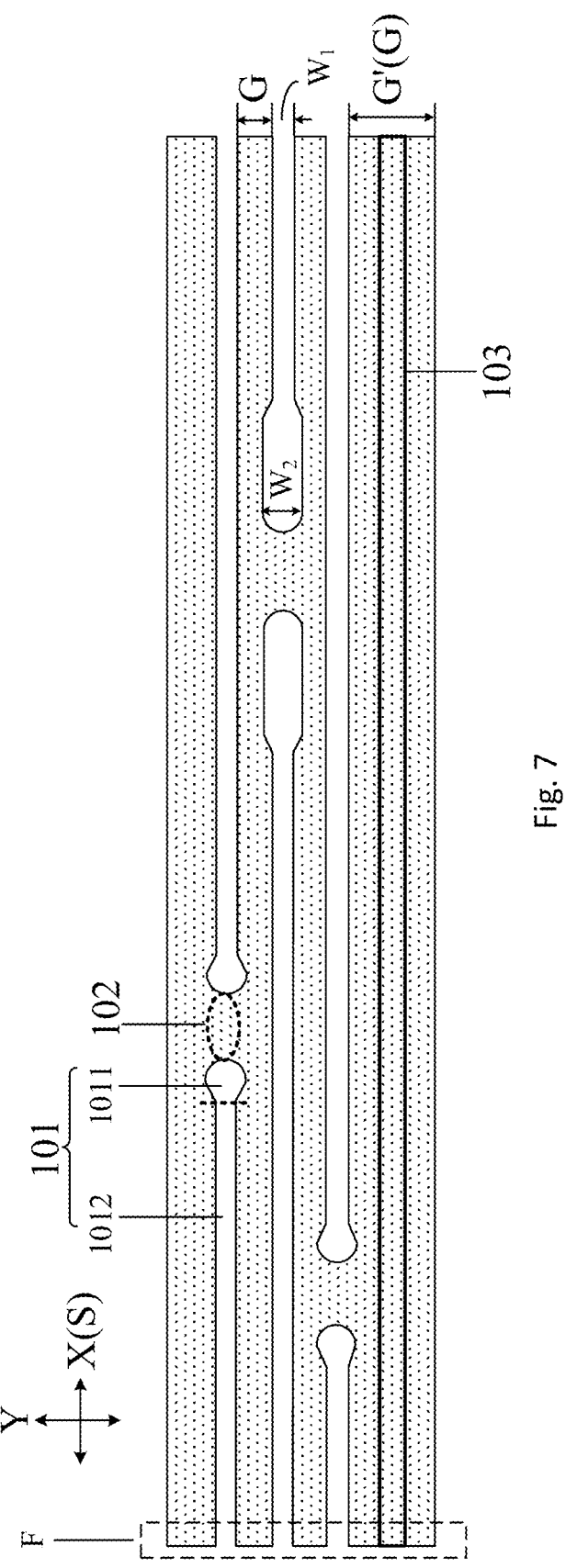
FIG. 7 is another structural schematic diagram of the bending area in the support plate according to an embodiment of the disclosure.

In some embodiments, in the above-mentioned support plate provided by the embodiments of the disclosure, as shown in FIGS. 3, 6 and 7, all the connecting portions 102 are staggered in the column direction Y, so that the connecting portions 102 are evenly distributed in the bending area BA, thus achieving the more even distribution of the bending stress.

Figure 8:
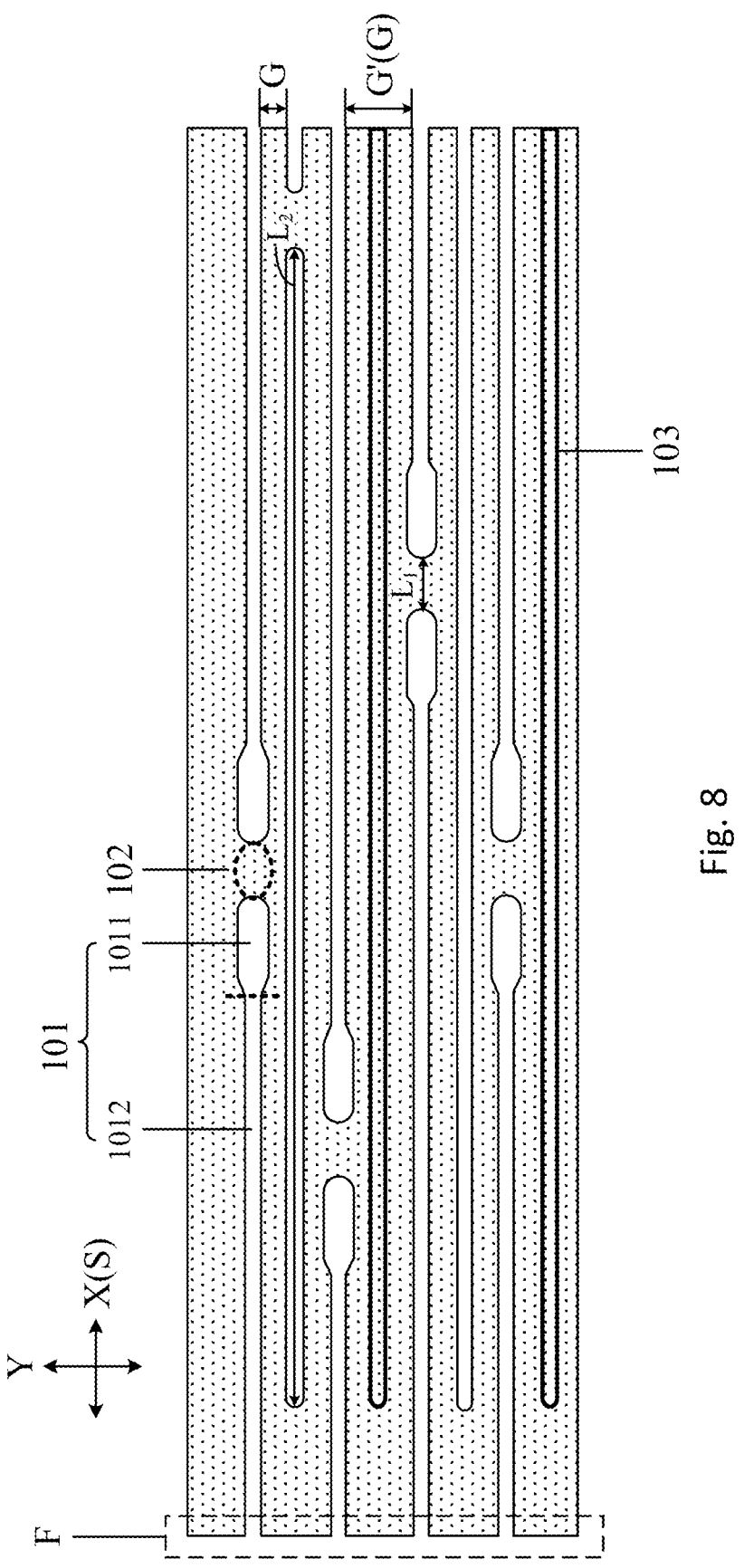
FIG. 8 is another structural schematic diagram of the bending area in the support plate according to an embodiment of the disclosure.
Figure 9:
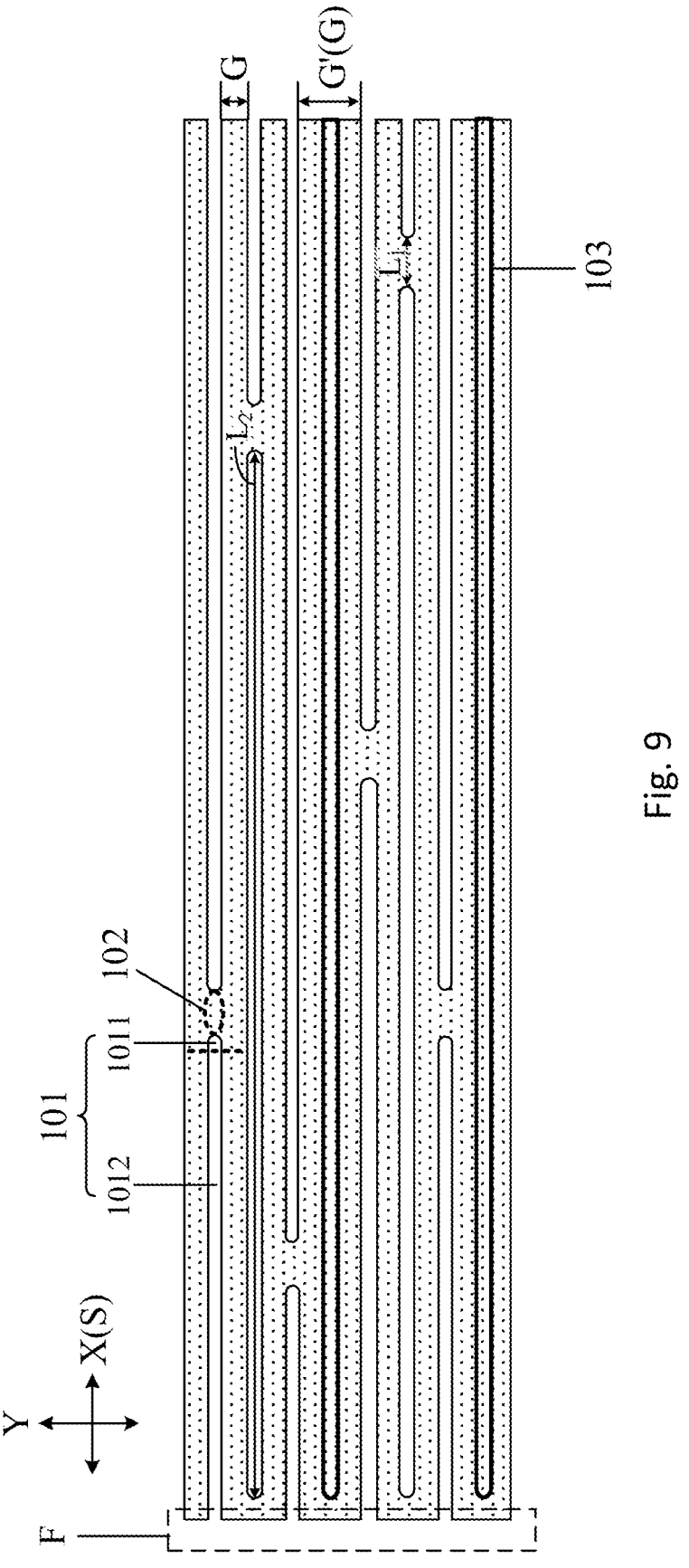
FIG. 9 is another structural schematic diagram of the bending area in the support plate according to an embodiment of the disclosure.
Figure 10:
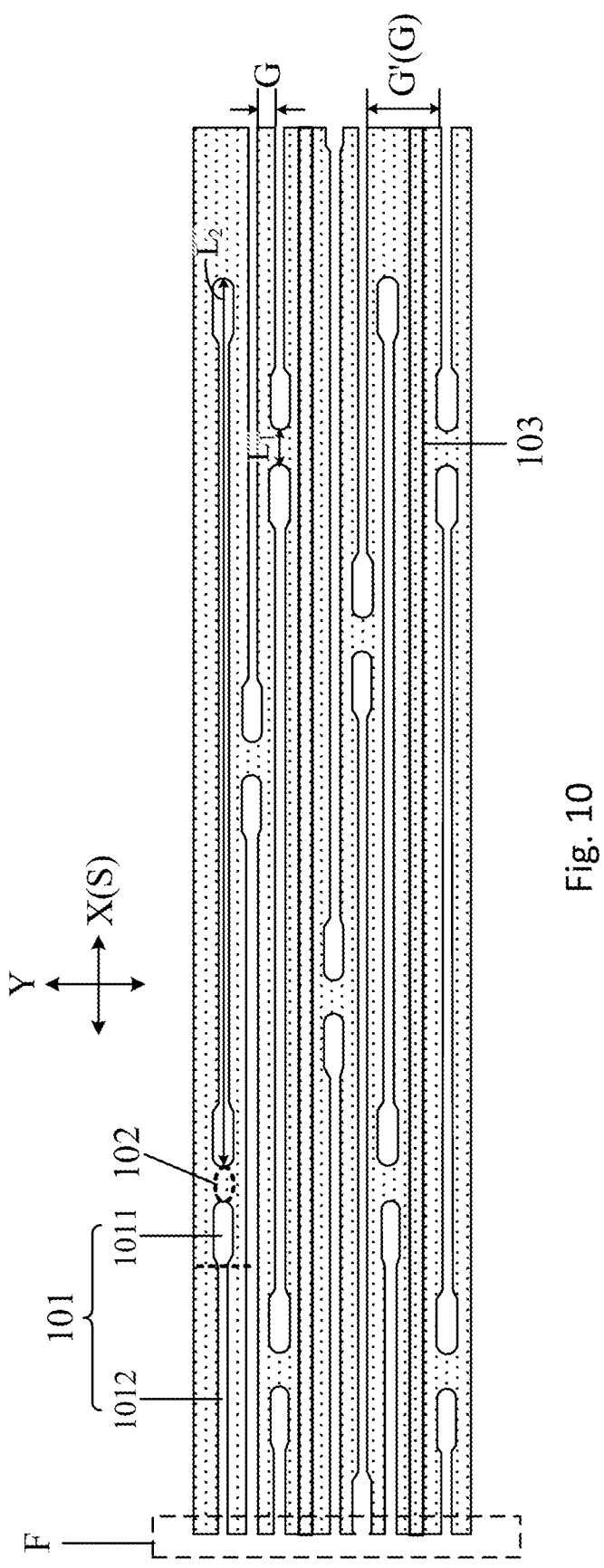
FIG. 10 is another structural schematic diagram of the bending area in the support plate according to an embodiment of the disclosure.

In some embodiments, in the above-mentioned support plate provided by the embodiments of the disclosure, as shown in FIGS. 8 to 10, every n (n≥3 and n is an integer) adjacent rows of hollowed-out patterns 101 is a cycle, and connecting portions 102 in a same cycle are staggered in the column direction Y. Exemplarily, in FIGS. 8 to 10, every five adjacent rows of hollowed-out patterns 101 are a cycle, and the connecting portions 102 in the same cycle are staggered in the column direction Y. Since the connecting portions 102 in the same cycle are staggered in the column direction Y, the bending stress in the same cycle can be evenly distributed. By setting more than three adjacent rows of hollowed-out patterns 101 as a cycle, there may be enough space to buffer the bending stress, so that the bending stress is distributed more evenly.

Figure 11:
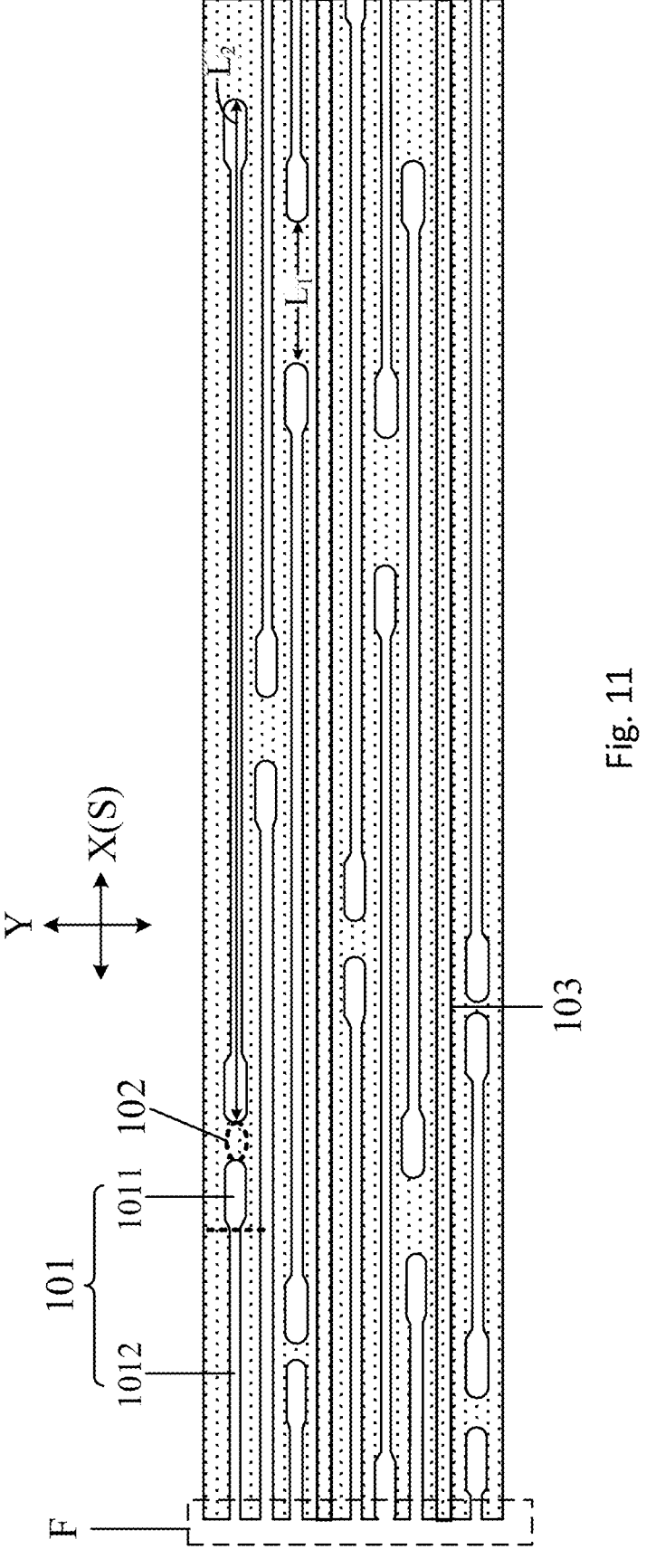
FIG. 11 is another structural schematic diagram of the bending area in the support plate according to an embodiment of the disclosure.

In some embodiments, in the above-mentioned support plate provided by the embodiments of the disclosure, as shown in FIGS. 8 to 10, the connecting portions 102 each has a same length $L_1$ in the row direction X, and the hollowed-out patterns 101 between any two adjacent connecting portions 102 in a same row each has a same length $L_2$ in the row direction X, to facilitate realization of the staggered arrangement of the connecting portions 102. Optionally, as shown in FIG. 11, the connecting portions 102 adjacent in the column direction Y have different lengths $L_1$ in the row direction X, and the hollowed-out patterns 101 between any two adjacent connecting portions 102 in a same row have different lengths $L_2$ in the row direction X, realizing the staggered arrangement of the connecting portions 102.

It should be noted that FIGS. 3, 6 to 11 only schematically provide partial enlarged views of the bending area BA, so only one connecting portion 102 is shown in one row. In the actual product, there may be a plurality of staggered connecting portions 102 in each row of the bending area BA.

In some embodiments, in the above-mentioned support plate provided by the embodiments of the disclosure, as shown in FIGS. 3, 6 to 11, the hollowed-out pattern 101 includes an end portion 1011. The end portion 1011 is arranged in contact with the connecting portion 102, and a contact surface between the end portion 1011 and the connecting portion 102 is a curved surface. The curved surface is more conducive to dispersing the bending stress and avoiding the concentration of the bending stress causing the film printing. The length $L_1$ of the connecting portion 102 in the row direction X may be defined as the distance between two end portions 1011 in contact with the connecting portion 102 in the row direction X.

In some embodiments, in the above-mentioned support plate provided by the embodiments of the disclosure, as shown in FIGS. 3, 6 to 11, the end portions 1011 on both sides of a same connecting portion 102 have the same shape, which not only facilitates the fabrication of the hollowed-out patterns 101, but also ensures the balanced distribution of the bending stress on both sides of the connecting portion 102. Optionally, as shown in FIGS. 3 and 9 to 11, all end portions 1011 may be set to have the same shape; or, as shown in FIGS. 6 to 8, the end portions 1011 in odd-numbered rows may be set to have the same shape, the end portions 1011 in even-numbered rows may be set to have the same shape, and the shape of the end portions 1011 in the odd-numbered rows is different from the shape of the end portions 1011 in the even-numbered rows. Through the combination of the end portions 1011 of the above shapes, the modulus of the support plate can be effectively adjusted to meet different bending requirements.

Figure 12:
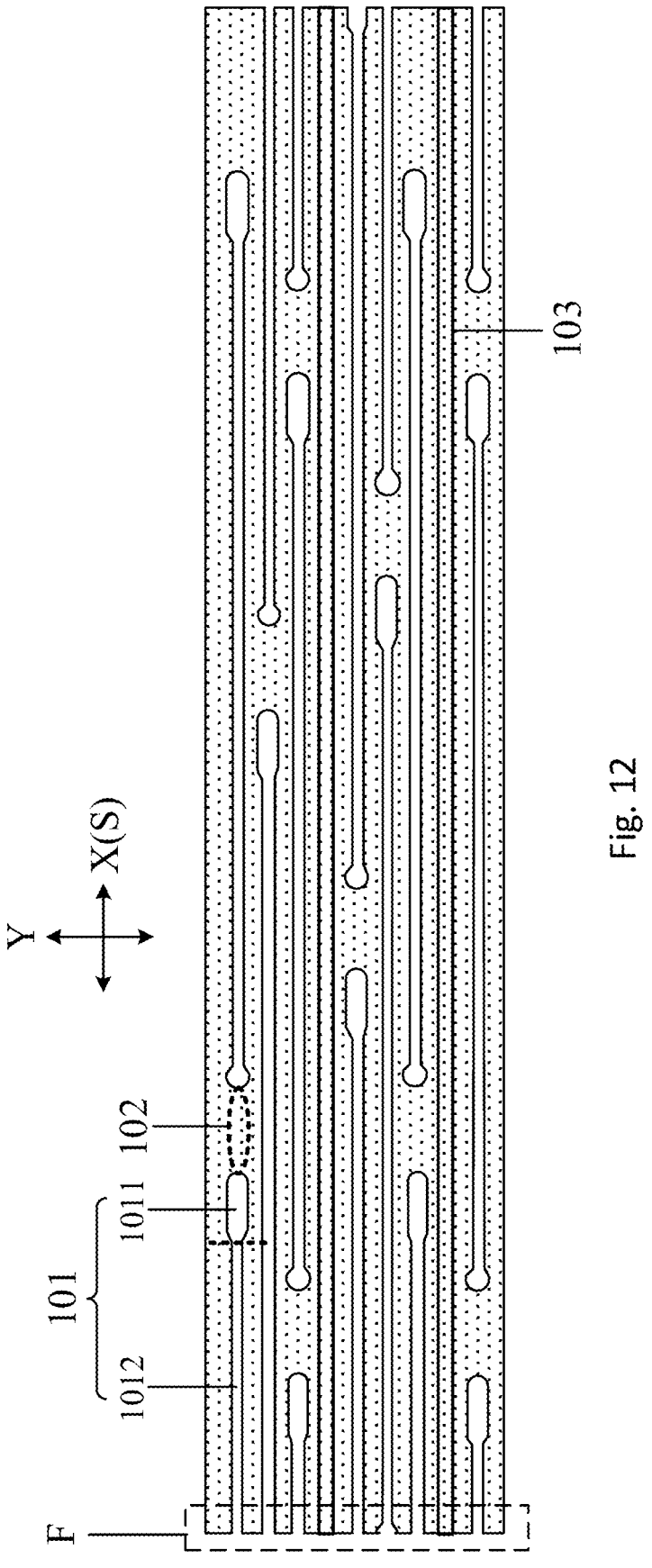
FIG. 12 is another structural schematic diagram of the bending area in the support plate according to an embodiment of the disclosure.
Figure 13:
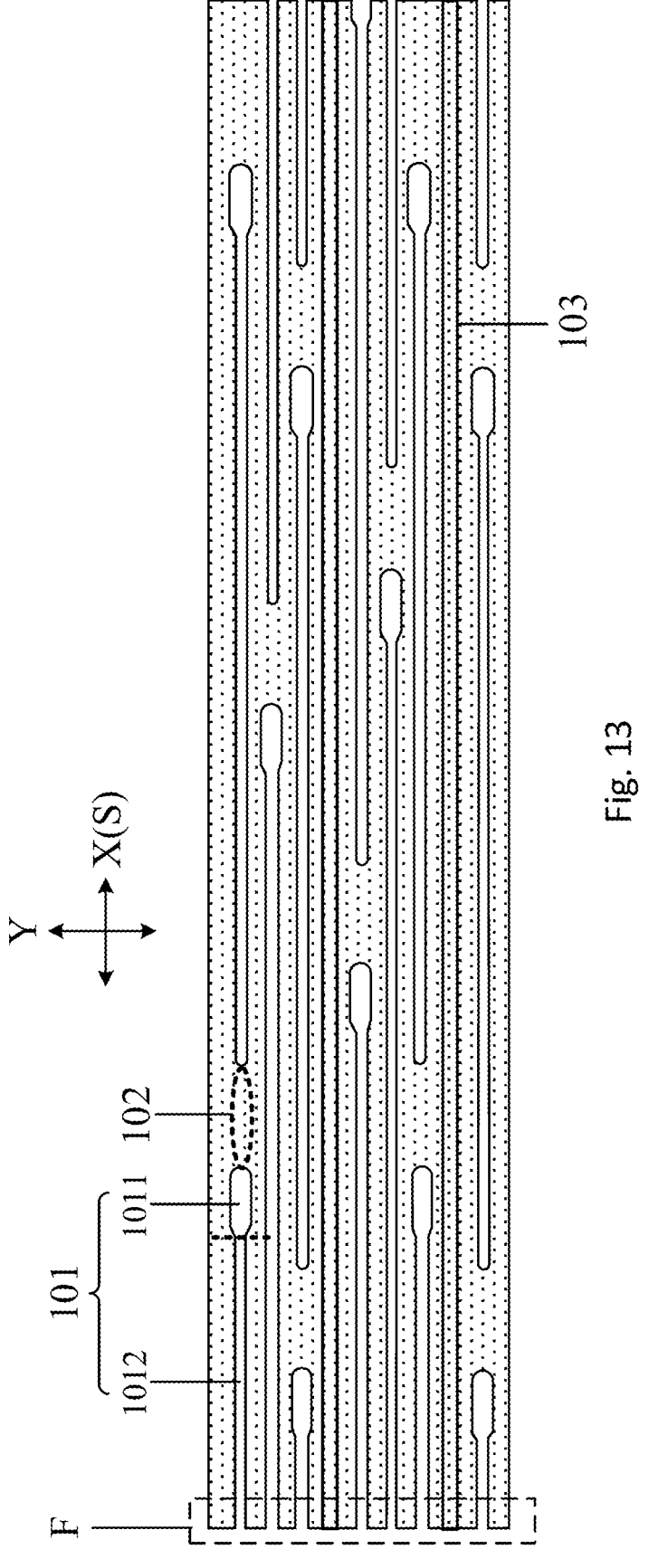
FIG. 13 is another structural schematic diagram of the bending area in the support plate according to an embodiment of the disclosure.
Figure 14:
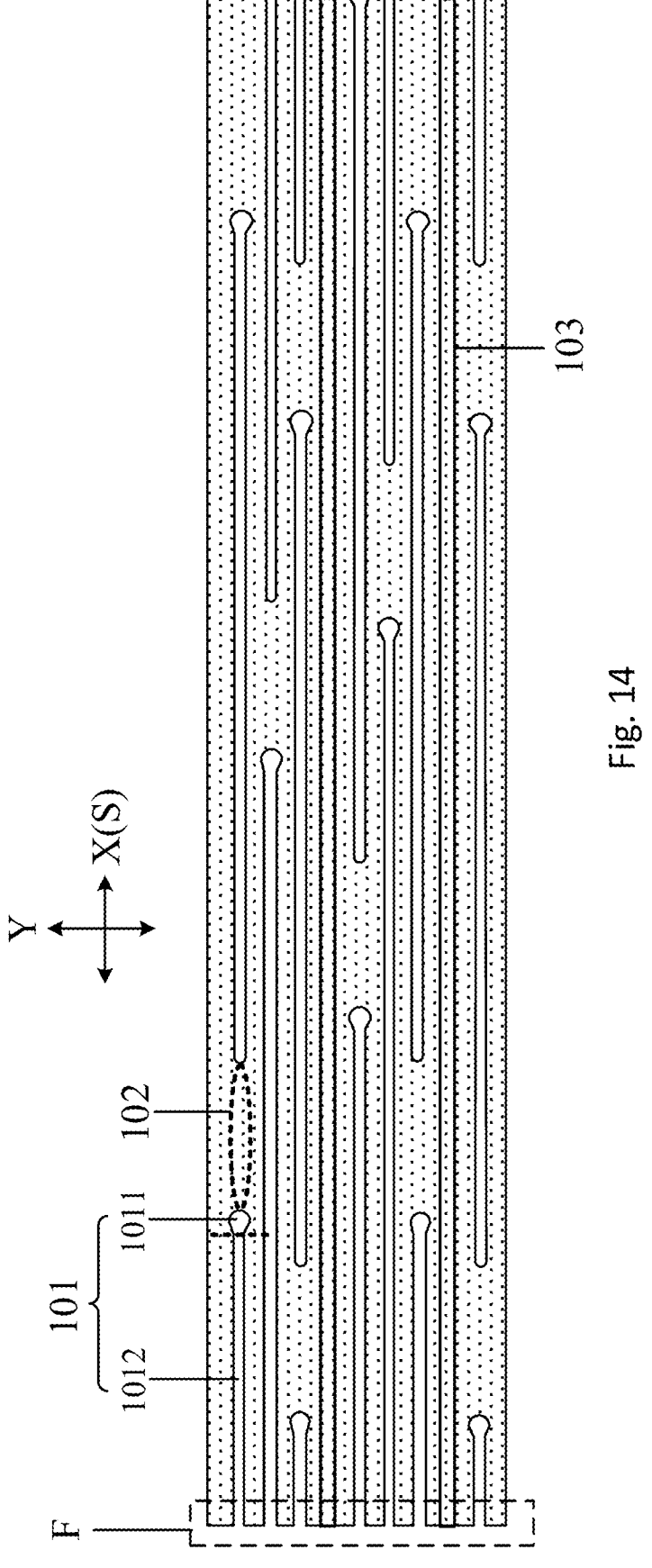
FIG. 14 is another structural schematic diagram of the bending area in the support plate according to an embodiment of the disclosure.

In some embodiments, in the above-mentioned support plate provided by the embodiments of the disclosure, as shown in FIGS. 12 to 14, the end portions 1011 on both sides of the same connecting portion 102 may also be set to have different shapes to adjust the modulus of the support plate. Optionally, during implementations, the modulus of the support plate may also be adjusted by adjusting the length and density of the hollowed-out patterns 101, which is not limited here.

In some embodiments, in the above-mentioned support plate provided by the embodiments of the disclosure, as shown in FIGS. 3, 6 and 7, the hollowed-out pattern 101 may further include an extension portion 1012. The extension portion 1012 is arranged integrally with the end portion 1011, and the extension portion 1012 is located at one side of the end portion 1011 away from the connecting portion 102. A width $W_1$ of the extension portion 1012 in the column direction Y is less than or equal to a maximum width $W_2$ of the end portion 1011 in the column direction Y, thereby facilitating the more even distribution of the bending stress.

In some embodiments, in the above-mentioned support plate provided by the embodiments of the disclosure, as shown in FIGS. 3, 6 to 14, the end portion 1011 may be drop-shaped, U-shaped or capsule-shaped, or of other shape that facilitates fabrication and can effectively adjust the modulus of the support plate. Of course, during implementations, the shape of the end portion 1011 may also be other shapes known to those skilled in the art, and is not specifically limited here.

In some embodiments, in the above-mentioned support plate provided by the embodiments of the disclosure, as shown in FIGS. 3 and 6 to 14, an edge F of the bending area BA extending in the column direction Y is discontinuously arranged. Specifically, the edge F of the bending area BA extending in the column direction Y is disconnected at the hollowed-out patterns 101 and is continuously arranged at the row gaps G of the hollowed-out patterns 101, so that the edge F of the bending area BA extending in the column direction Y is discontinuously arranged on the whole. The discontinuously-arranged edge F of the bending area BA increases the elasticity of the bending area BA, and is beneficial to improving the resilience and flatness of the bending area BA during unfolding.

In some embodiments, in the above-mentioned support plate provided by the embodiments of the disclosure, as shown in FIGS. 3 and 6 to 14, an extending direction of the hollowed-out patterns 101 (equivalent to the row direction X) is parallel to a bending axis S of the bending area BA, so that the support plate is easy to bend when folded and can quickly rebound to the flat state when unfolded.

Figure 2:
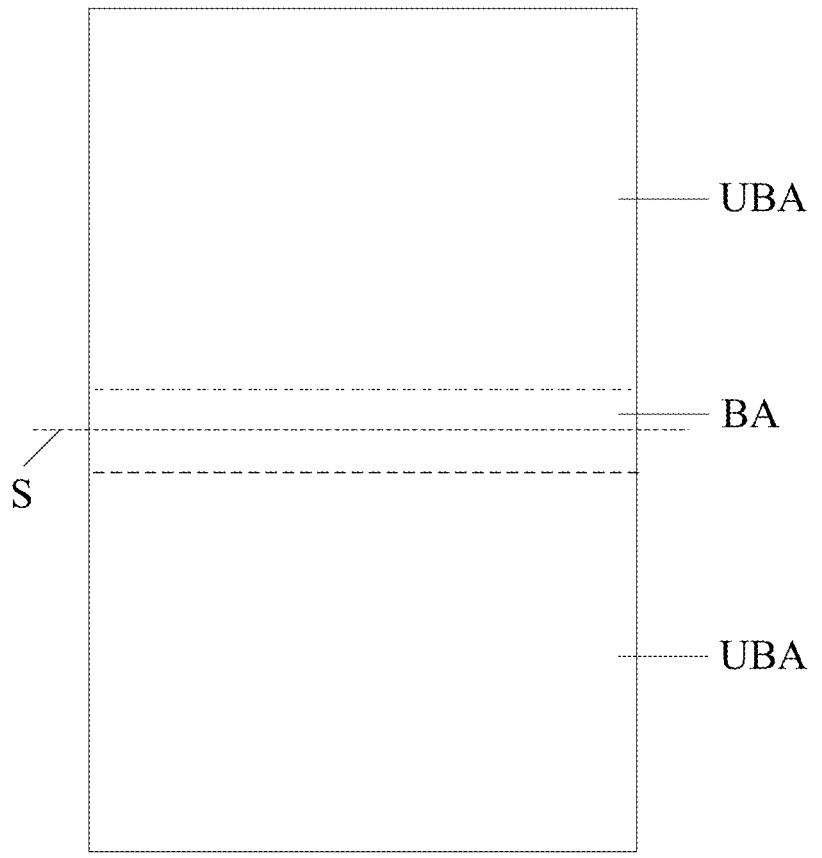
FIG. 2 is a schematic diagram of the support plate in the unfolded state according to an embodiment of the disclosure.

In some embodiments, in the above-mentioned support plate provided by the embodiments of the disclosure, as shown in FIGS. 1 and 2, the support plate may further include unbending areas UBAs located on both sides of the bending area BA parallel to the bending axis S, so that the folding performance of the support plate is satisfied through the bending area BA; and no hollowed-out pattern 101 or groove 103 may be arranged in the unbending areas UBAs, so that the support performance of the support plate can be satisfied through the unbending areas UBAs. In some embodiments, in order to meet the weight reduction requirement and achieve lightweighting, blind holes may be arranged in the unbending areas UBAs. Optionally, the unbending areas UBA on both sides may have the same area, that is, the bending area BA is located in the central area of the support plate.

Based on the same inventive concept, embodiments of disclosure provide a display device. Since the principle of the display device to solve the problem is similar to the principle of the above-mentioned support plate to solve the problem, so the implementations of the display device provided by the embodiments of the disclosure can refer to the implementations of the above-mentioned support plate provided by the embodiments of the disclosure, and the repeated description thereof will be omitted.

Figure 15:
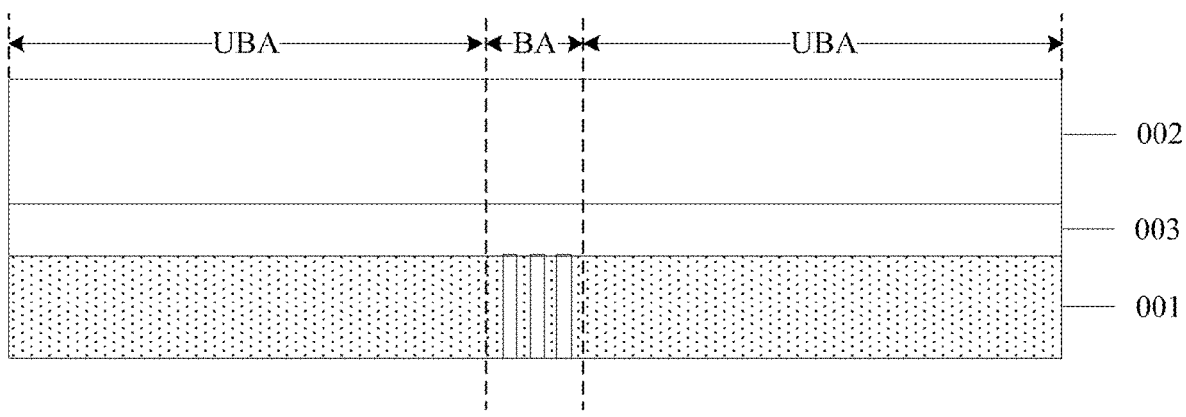
FIG. 15 is a schematic structural diagram of a display device according to an embodiment of the disclosure.

The display device provided by embodiments of disclosure, as shown in FIG. 15, includes: a support plate 001 and a flexible display module 002. The support plate 001 is the above-mentioned support plate 001 provided by the embodiments of the disclosure. The support plate 001 is attached to the opposite side of the display side of the flexible display module 002. Optionally, the support plate 001 is attached to the opposite side of the display side of the flexible display module 002 through an adhesive layer 003. The adhesive layer 003 may be arranged on the entire surface. Optionally, in order to simplify the manufacturing process of the adhesive layer 003 and ensure the better flatness of the adhesive layer 003, the adhesive layer 003 may also be arranged only in the unbending areas UBAs, that is, the adhesive layer 003 is not arranged in the bending area BA. Since the support plate 001 is hard, even the support plate 001 is attached to the flexible display module 002 only in the unbending areas UBAs, the support plate 001 can still play a better supporting role for the flexible display module 002 in the bending area BA.

Furthermore, during the assembly process of the support plate 001 and the flexible display module 002, a large assembly deviation may occur. In such a case, in order to reduce the scrap rate, the support plate 001 needs to be removed and reassembled with the flexible display module 002. Based on this, the above-mentioned adhesive layer 003 may be made of ultraviolet viscosity-reducing adhesive, double-sided adhesive, pressure-sensitive adhesive or hot melt adhesive, etc. When the adhesive layer 003 is made of ultraviolet viscosity-reducing adhesive, the viscosity of the ultraviolet viscosity-reducing adhesive may be reduced by irradiation of the ultraviolet light, so as to remove the support plate 001. When the adhesive layer 003 is made of double-sided adhesive, the support plate 001 may be directly torn off, and the support plate 001 may be easily removed. When the adhesive layer 003 is made of pressure-sensitive adhesive, the viscosity of the pressure-sensitive adhesive may be reduced by changing the pressure, so as to remove the support plate 001. When the adhesive layer 003 is made of hot melt adhesive, the viscosity of the hot melt adhesive may be reduced by heating, so as to remove the support plate 001. In addition, the adhesive layer 003 may also be made of other materials (such as foam glue), which is not limited here.

Figure 16:
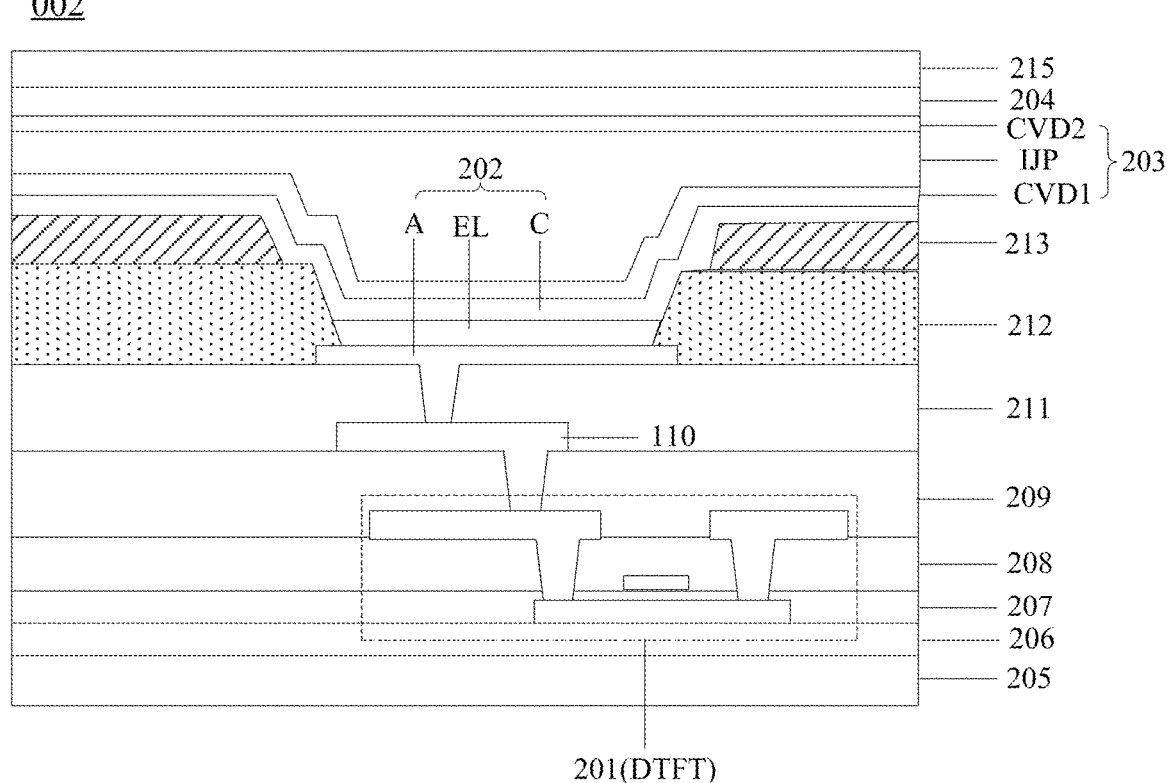
FIG. 16 is a schematic structural diagram of a sub-pixel in the flexible display module according to an embodiment of the disclosure.
Figure 17:
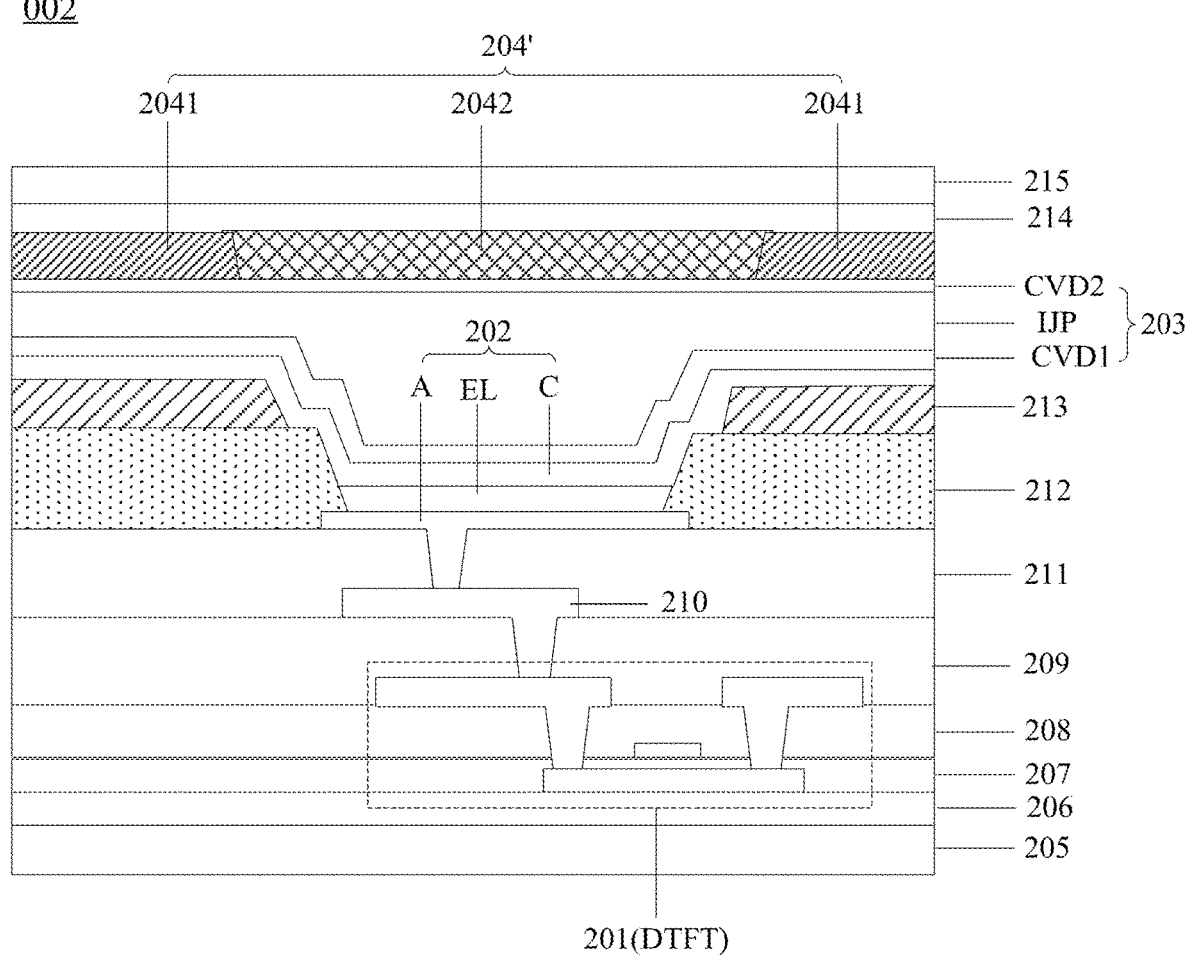
FIG. 17 is another schematic structural diagram of a sub-pixel in the flexible display module according to an embodiment of the disclosure.

In some embodiments, in the above display device provided by the embodiments of the disclosure, as shown in FIG. 16, the flexible display module 002 may include: a pixel driving circuit 201 (only a driving transistor DTFT is shown in the figure), a light emitting device 202 (which may be OLED, QLED, etc.), an encapsulation layer 203 and a circular polarizer 204. The pixel driving circuit 201 is electrically connected to the light emitting device 202, to drive the light emitting device 202 to emit light and display. The encapsulation layer 203 includes a first inorganic encapsulation layer CVD1, an organic encapsulation layer IJP and a second inorganic encapsulation layer CVD2 that are stacked, to effectively avoid the corrosion of the luminescent material layer EL in the light emitting device 202 by water and oxygen, and improve the lifetime of the light emitting device 202. The circular polarizer 204 includes a linear polarizing layer and a quarter-wave plate layer, to reduce the reflection of the ambient light by the anode A/cathode C of the light emitting device 202 and the metal layer of the pixel driving circuit 201. In some embodiments, as shown in FIG. 17, a color film layer 204' may also be used to reduce the reflection of the ambient light by the anode A/cathode C of the light emitting device 202 and the metal layer of the pixel driving circuit 201. Moreover, compared with the circular polarizer 204, the color film layer 204' has a greater transmittance for the light emitted by the light emitting device

202. Optionally, the color film layer 204' includes a black matrix 2041 and a plurality of color filters 2042 separated by the black matrix 2041. The color filters 2042 may include a red color filter R, a green color filter G, and a blue color filter B. Moreover, as shown in FIGS. 16 and 17, the flexible display module 002 may further include a base substrate 205, a buffer layer 206, a gate insulating layer 207, an interlayer dielectric layer 208, a first planarization layer 209, a switch electrode 210, a second planarization layer 211, a pixel definition layer 212, a support layer 213, a third planarization layer 214, a protective cover plate 215 (such as an ultra-thin glass cover plate), etc. All of other indispensable components of the flexible display module 002 should be understood by those ordinary skilled in the art to be included, and will be omitted here and should not be considered as limitations on the disclosure.

In some embodiments, the above display device provided by the embodiments of the disclosure may be: mobile phone, tablet computer, television, display, notebook computer, digital photo frame, navigator, smart watch, fitness wristband, personal digital assistant, and any other product or component with display function. The display device may include but not limited to: a radio frequency unit, a network module, an audio output & input unit, a sensor, a display unit, a user input unit, an interface unit, a memory, a processor, a power supply, etc. Furthermore, those skilled in the art can understand that the above-mentioned structure does not constitute a limitation on the above display device provided in the embodiments of the disclosure. In other words, the above display device provided in the embodiments of the disclosure may include more or fewer components than the above components, or combine certain components, or use different component arrangements.

Evidently, those skilled in the art can make various modifications and variations to the embodiments of the disclosure without departing from the spirit and scope of the embodiments of the disclosure. Thus, the disclosure is also intended to encompass these modifications and variations to the embodiments of the disclosure as long as these modifications and variations come into the scope of the claims of the disclosure and their equivalents.

What is claimed is:

1. A support plate for supporting a flexible display module, wherein:

the support plate comprises a bending area;

the bending area comprises a plurality of hollowed-out patterns arranged in an array, a connecting portion is provided between two adjacent hollowed-out patterns in a same row, and connecting portions in at least three adjacent rows are staggered in a column direction;

the bending area further comprises grooves in at least some of row gaps of the hollowed-out patterns, wherein each of the grooves extends across the bending area in the row direction; and wherein every three adjacent rows of hollowed-out patterns form a group, and the grooves are in group gaps of the hollowed-out patterns.

2. The support plate according to claim 1, wherein all the connecting portions are staggered in the column direction.

3. The support plate according to claim 1, wherein every n adjacent rows of hollowed-out patterns is a cycle, and connecting portions in a same cycle are staggered in the column direction; wherein n>3 and n is an integer.

4. The support plate according to claim 1, wherein the connecting portions have a same length in a row direction, and the hollowed-out patterns between any two adjacent connecting portions in a same row have a same length in the row direction.

5. The support plate according to claim 1, wherein the connecting portions adjacent in the column direction have different lengths in a row direction, and the hollowed-out patterns between any two adjacent connecting portions in a same row have different lengths in the row direction.

6. The support plate according to claim 1, wherein the hollowed-out pattern comprises an end portion, the end portion is arranged in contact with the connecting portion, and a contact surface between the end portion and the connecting portion is a curved surface.

7. The support plate according to claim 6, wherein end portions on both sides of a same connecting portion have a same shape.

8. The support plate according to claim 7, wherein all end portions have a same shape.

9. The support plate according to claim 7, wherein end portions in odd-numbered rows have a same shape, end portions in even-numbered rows have a same shape, and the shape of the end portions in the odd-numbered rows is different from the shape of the end portions in the even-numbered rows.

10. The support plate according to claim 6, wherein end portions on both sides of a same connecting portion have different shapes.

11. The support plate according to claim 6, wherein the hollowed-out pattern further comprises an extension portion, the extension portion is arranged integrally with the end portion, the extension portion is located at one side of the end portion away from the connecting portion, and a width of the extension portion in the column direction is less than or equal to a maximum width of the end portion in the column direction.

12. The support plate according to claim 6, wherein the end portion is drop-shaped, U-shaped or capsule-shaped.

13. The support plate according to claim 1, wherein an edge of the bending area extending in the column direction is discontinuously arranged.

14. The support plate according to claim 1, wherein an extending direction of the hollowed-out pattern is parallel to a bending axis of the bending area.

15. The support plate according to claim 1, wherein the support plate further comprises unbending areas located on both sides of the bending area parallel to a bending axis.

16. A display device, comprising: a flexible display module and a support plate, wherein the support plate is the support plate according to claim 1, and the support plate is attached to an opposite side of a display side of the flexible display module.

17. The support plate according to claim 1, wherein a connecting line between a center point of any one of the connecting portions and a center point of any other one of the connecting portions is not parallel to the column direction.

* * * * *